(12) United States Patent
Neubrand et al.

(10) Patent No.: US 8,056,957 B2
(45) Date of Patent: Nov. 15, 2011

(54) TORSION SPRING SYSTEM FOR CONVERTIBLE TOP

(75) Inventors: Frank Neubrand, W. Bloomfield, MI (US); Ryan Mitchell, Belleville, MI (US); Wolfgang Richter, Diepholz (DE); Holger Schramm, Bissendorf (DE); Sven Hollenbeck, Westerkappein (DE)

(73) Assignee: Wilhelm Karmann GmbH, Munich (DE)

( * ) Notice: Subject to any disclaimer, the term of this patent is extended or adjusted under 35 U.S.C. 154(b) by 114 days.

(21) Appl. No.: 12/726,802

(22) Filed: Mar. 18, 2010

(65) Prior Publication Data

US 2011/0227364 A1 Sep. 22, 2011

(51) Int. Cl.
*B60J 7/08* (2006.01)
(52) U.S. Cl. ....................................................... 296/113
(58) Field of Classification Search ................ 296/113, 296/133, 134, 117, 107.08, 121
See application file for complete search history.

(56) References Cited

U.S. PATENT DOCUMENTS

| 1,221,669 | A | | 4/1917 | Buch | |
|---|---|---|---|---|---|
| 2,297,820 | A | * | 10/1942 | Westrope | 296/117 |
| 2,329,802 | A | * | 9/1943 | Westrope | 296/117 |
| 2,856,231 | A | * | 10/1958 | Zeman | 296/117 |
| 3,348,876 | A | * | 10/1967 | Pollak et al. | 296/121 |
| 4,258,831 | A | * | 3/1981 | Weber | 188/119 |
| 4,776,626 | A | * | 10/1988 | Seyler | 296/76 |
| 5,620,226 | A | * | 4/1997 | Sautter, Jr. | 296/107.08 |
| 5,967,590 | A | * | 10/1999 | Beierl et al. | 296/107.01 |
| 6,957,842 | B1 | * | 10/2005 | Garska | 296/107.12 |
| 7,063,371 | B2 | * | 6/2006 | Willard | 296/107.17 |
| 7,347,482 | B2 | * | 3/2008 | Powell | 296/107.08 |
| 2005/0173943 | A1 | * | 8/2005 | Duffy | 296/146.12 |
| 2007/0170750 | A1 | | 7/2007 | Just et al. | |

* cited by examiner

*Primary Examiner* — Kiran B. Patel
(74) *Attorney, Agent, or Firm* — Gifford, Krass, Sprinkle, Anderson & Citkowski, P.C.; Douglas L. Wathen

(57) ABSTRACT

A convertible top includes a linkage assembly that is movable between an extended position and a retracted position, with a mid position defined therebetween. A spring system assists movement of the linkage assembly from the extended position to the mid position and also from the retracted position to the mid position.

8 Claims, 4 Drawing Sheets

TORSION SPRING SYSTEM FOR CONVERTIBLE TOP

FIELD OF THE INVENTION

The present invention relates generally to convertible tops and, more specifically, to a spring system for convertible tops.

BACKGROUND OF THE INVENTION

Convertible tops for vehicles have a wide variety of designs, including soft tops, hard tops, manually operated tops, power operated tops, and other designs. A convertible top typically includes a top linkage assembly including roof elements that either define or support an outer surface of the top when it is in an extended position. Significant effort goes into the design of the linkage assembly to satisfy design goals such as compact packaging of the linkage assembly in the retracted position; secure, stable and aesthetic positioning of the roof elements in the extended position; and rapid and reliable movement of the linkage assembly between the extended and retracted positions.

The entire top assembly is often heavy and requires significant force to move the system between the retracted and extended positions. Some systems include actuators for moving the linkage assembly and its associated latching assemblies while other linkage assemblies are designed to be manually operated. It is desirable to reduce the amount of force necessary to move the top in one or both directions, and significant effort is often invested in designing the linkage assembly so as to reduce the force necessary at particular points in the movement and throughout the overall movement. However, there remains a need for improved systems for reducing the force that must be applied to the linkage assembly either by actuators or during manual operation.

SUMMARY OF THE INVENTION

The present invention provides a convertible top system for a vehicle having a vehicle body with a passenger compartment defined therein. The top includes a convertible top linkage assembly with a plurality of roof elements. The linkage assembly is movable between an extended position wherein the roof elements extend over the passenger compartment and a retracted position wherein the roof elements are stowed at least partially in the vehicle body. The linkage assembly has a mid position defined such that the linkage assembly passes through the mid position when the linkage assembly is moved between the extended and retracted positions.

The top further includes a spring system for assisting movement of the linkage assembly from the extended position to the mid position and from the retracted position to the mid position. The spring system includes a first spring element having a loaded position and a released position. The first spring element is biased from the loaded position to the released position. The first spring element is interconnected with the top linkage assembly such that the first spring element is in the loaded position when the linkage assembly is in the retracted position and is in the released position when the linkage assembly is in the mid position. The first spring element urges the linkage assembly from the retracted position to the mid position.

A second spring element has a loaded position and a released position. The second spring element is biased from the loaded position to the released position. The second spring element is interconnected with the top linkage assembly such that the second spring element is in the loaded position when the linkage assembly is in the extended position and is in the released position when the linkage assembly is in the mid position. The second spring element urges the linkage assembly from the extended position to the mid position.

In some embodiments, the roof elements include roof rails and roof bows and the top includes a flexible cover supported by the roof elements and defining an outer surface of the top when the roof elements are in the extended position.

One of the roof elements may be pivotally interconnected with the vehicle body, and the spring system may be interconnected with the one of the roof elements. In some versions, one of the roof elements includes a gear element interconnected therewith and the spring system includes a spring engaging element, the spring engaging element having a gear portion engaged with the gear element such that rotation of the gear portion causes rotation of the gear element.

In further versions, the spring elements are clock springs each having an inner end and an outer end. The spring system may include an adjustment member, with one of the ends of each of the clock springs being interconnected with the adjustment member and the other of the ends of each of the clock springs being interconnected with the spring engaging element.

The adjustment member may have a central hub, with the inner ends of the clock springs being interconnected with the central hub. The spring engaging member may have an outwardly extending arm, with the outer ends of the clock springs engaging the outwardly extending arm.

DETAILED DESCRIPTION OF THE PREFERRED EMBODIMENTS

The present invention provides a convertible top with a spring system that assists movement of the convertible top linkage system from an extended position to a mid position and from a retracted position to a mid position. Both the convertible top linkage assembly and the spring system may take a variety of forms. Exemplary versions of both are illustrated in the figures and discussed hereinbelow.

Figure 1:
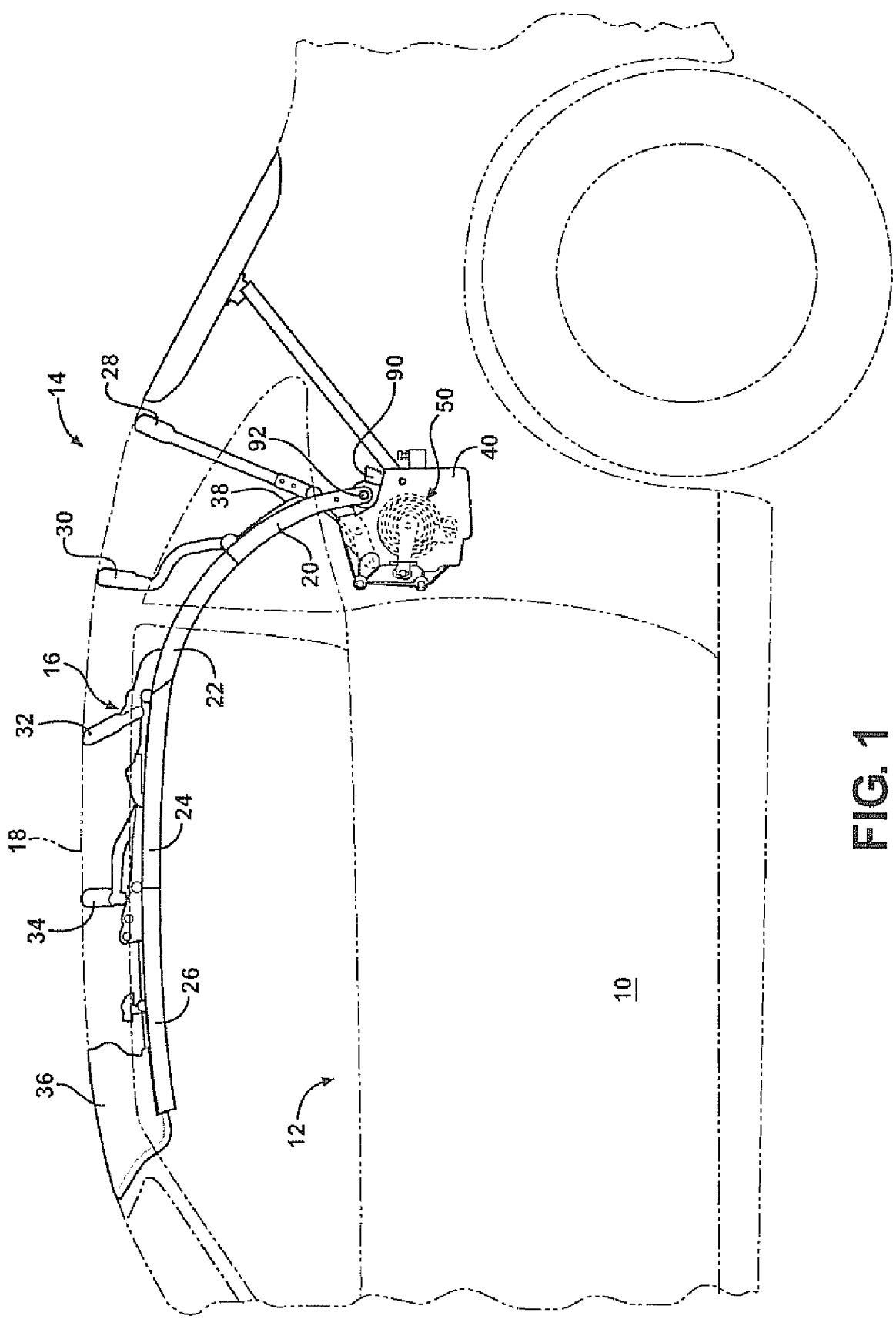
FIG. 1 is a side elevational view of an exemplary convertible top including a spring system in accordance with the present invention.

FIG. 1 illustrates, in phantom lines, a vehicle body 10 with a passenger compartment 12 defined therein. A convertible top according to an embodiment of the present invention is shown at 14. The top 14 is shown in an extended position in FIG. 1, wherein the top extends over the passenger compartment 12. It is understood that the top 14 also has a retracted position wherein the top is at least partially stowed in the vehicle body, typically rearwardly of the passenger compartment. The top 14 includes a convertible top linkage assembly 16 with a plurality of roof elements. As will be clear to those of skill in the art, a top linkage that forms part of the present invention may take a wide variety of forms. In the illustrated embodiment, the top linkage assembly 16 is for a convertible soft top wherein the plurality of roof elements supports a flexible cover 18 that defines a visible outer surface of the top 14. In the illustrated embodiment, the convertible top linkage assembly 16 includes a plurality of side rails 20, 22, 24 and 26; a plurality of roof bows 28, 30, 32 and 34; and a header panel or bow 36 defining a forward end of the top 14. A variety of additional links are provided for articulating the roof elements between the extended position and the retracted position. For example, a balance link is shown at 38. The rearmost side rail 20 and the balance link 38 are both pivotally interconnected with the vehicle body 10 via a body mounting bracket 40. Additional links and elements are also provided to complete the convertible top. However, as these additional elements, and variations and alternatives thereto, will be clear to those of skill in the art, these additional elements are not described herein.

FIG. 1 illustrates the convertible top linkage assembly 16 in the extended position wherein the roof elements extend over the passenger compartment 12. The linkage assembly folds and articulates into a retracted position wherein the roof elements are stowed at least partially in the vehicle body. The linkage assembly may also be said to pass through a mid position between the extended positions and retracted positions. This mid position may be any position in between the extended and retracted positions. As known to those of skill in the art, a force must be applied to the linkage assembly 16 to move the linkage assembly from the extended position towards the retracted position. Likewise, a force must be applied to the linkage assembly 16 when it is in the retracted position to move the linkage assembly from the retracted position towards the extended position. At some point between the extended and retracted positions, the linkage assembly 16 reaches a neutral position wherein the force that must be applied to continue moving the linkage assembly towards the extended position and the force necessary to continue moving the linkage assembly towards the extended position are equal or nearly equal. In some embodiments, the mid position may be at or close to this neutral position.

FIG. 1 also shows an embodiment of a spring system 50 that forms part of the present invention. The spring system 50 is interconnected with the linkage assembly 16 so as to assist in movement of the linkage assembly from the extended position to the mid position and from the retracted position to the mid position.

Figure 2:
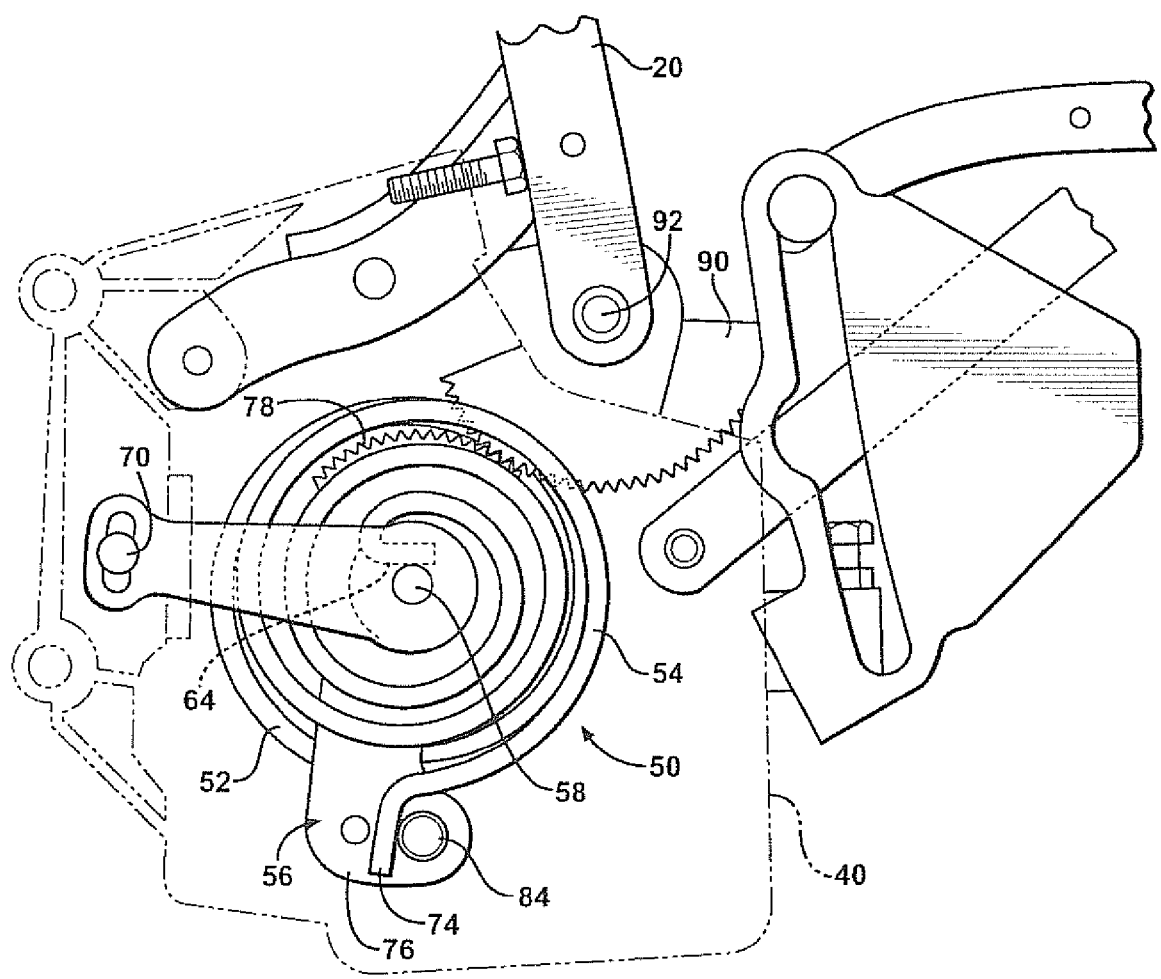
FIG. 2 is a detailed view of a spring system according to an embodiment of the present invention.
Figure 3:
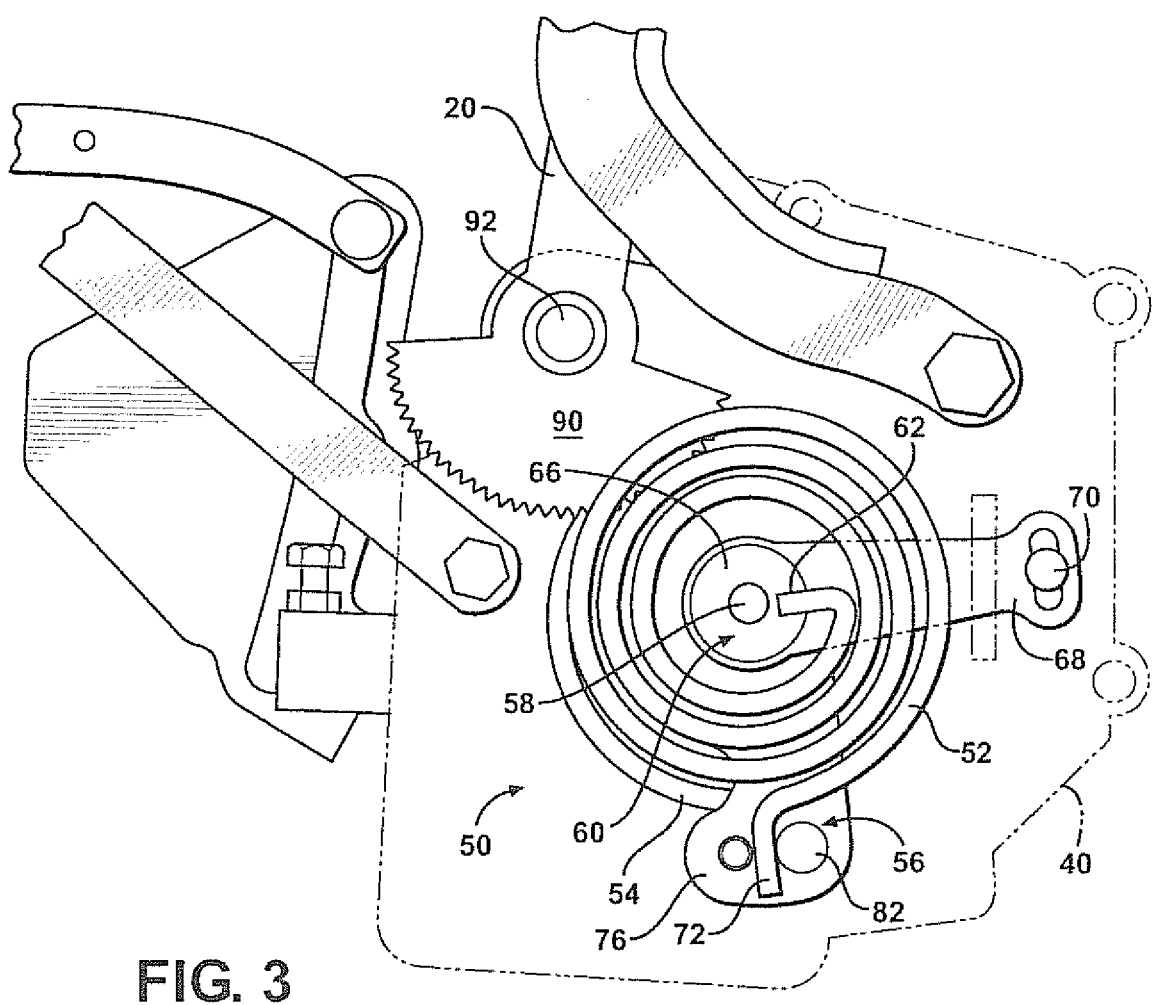
FIG. 3 is an opposite side view of the spring system of FIG. 2.
Figure 4:
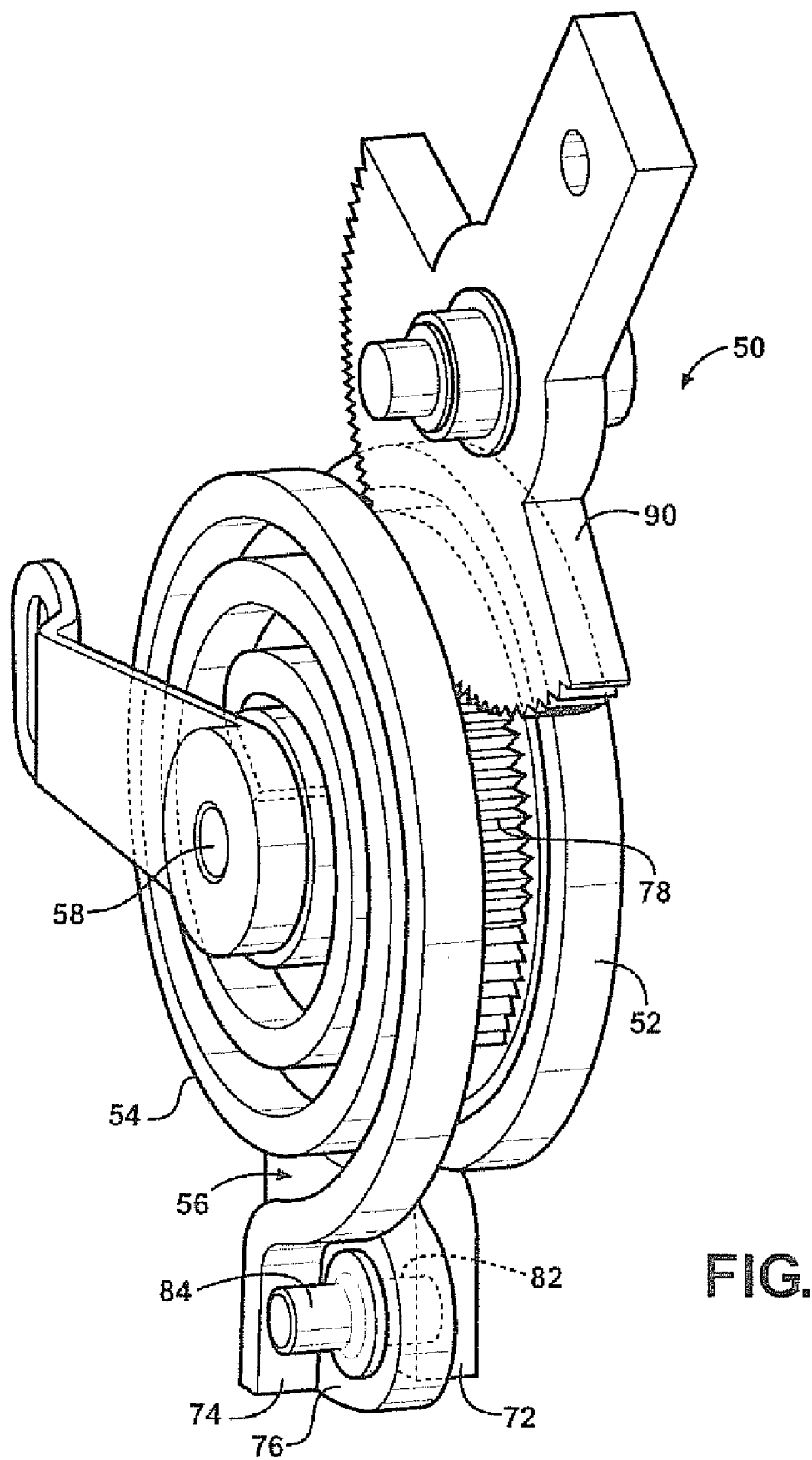
FIG. 4 is a perspective view of a portion of the spring system of FIGS. 2 and 3 with extraneous parts removed.

Referring now to FIGS. 2-4, the spring system 50 is shown in additional detail. In the illustrated embodiment, the spring system 50 includes a pair of spring elements 52 and 54. The spring elements 52 and 54 take the form of clock springs and work as torsion springs. The spring system also includes a spring-engaging member 56 that is positioned between the spring elements 52 and 54 and acts to transmit force between the spring elements and the top linkage assembly. The spring elements 52 and 54 and the spring-engaging member 56 are all supported by a central support 58. The inner ends 62 and 64 of the spring elements 52 and 54, respectively, are both interconnected with an adjustment member 60. The adjustment member 60, in turn, is supported on the central support 58. The adjustment member 60 has a central hub 66 to which the inner ends 62 and 64 of the spring elements are connected, and an outwardly extending adjustment arm 68 that is adjustably interconnected with the body bracket 40 via an adjusting bolt 70. The central hub 66 of the adjustment member 60 may be rotated on the central support 58 by loosening the adjustment bolt 70 and moving the end of the arm 68 upwardly and downwardly. This, in turn, adjusts the position of the inner ends 62 and 64 of the spring elements. As an alternative, two adjustment members may be provided so that the positions of the inner ends of the springs may be adjusted independently. As a further alternative, the inner ends of one or both springs may be fixed if no adjustment is required.

The spring-engaging member 56 is rotatably supported on the central support 58. The spring-engaging member 56 includes an outwardly extending arm 76. The spring elements 52 and 54 have outer ends 72 and 74, respectively. The outwardly extending arm 56 of the spring-engaging member 56 has protrusions 82 and 84 extending generally perpendicularly therefrom so as to engage the outer ends 72 and 74 of the spring elements 52 and 54, respectively. The positioning of the protrusions relative to the outer ends of the spring elements will be described with respect to FIG. 2, which corresponds to the side view of FIG. 1. As can be seen in FIG. 2, clockwise movement of the spring-engaging member 56 causes the outer end of the outwardly extending arm 76 to move from right to left. The protrusion 84 is positioned to the right side of the outer end 74 of the spring element 54. As such, as the spring-engaging member 56 rotates clockwise, with respect to FIG. 2, the protrusion 84 engages the outer end 74 of the spring element 54 and loads the spring 54. Likewise, rotation of the spring-engaging member in a counterclockwise direction causes the outer end of the outwardly extending arm 76 to move from left to right as viewed in FIG. 2. FIG. 3 illustrates an opposite side view, such that the directions are reversed. As shown, the protrusion 82 is positioned so as to engage the outer end 72 of the spring element 52 when the spring-engaging member 56 moves in the opposite direction, which is a counterclockwise direction in FIG. 2 or a clockwise rotation with respect to FIG. 3. As will be clear to those of skill in the art, the overall spring system thereby loads one of the spring elements when the spring-engaging member rotates in one direction and loads the other of the spring elements when the spring-engaging member 56 rotates in the opposite direction. As shown, the outwardly extending arm 76 does not engage the other side of each of the outer ends 72 and 74 of the spring elements. In other words, the protrusions 82 and 84 are only provided on one side of the outer ends 72 and 74, respectively, of the springs. As such, when the spring-engaging member 56 moves in one direction, one of the protrusions engages one of the ends of one of the spring elements while the other protrusion moves away from the outer end of the other spring element thereby leaving it unloaded.

This spring system may be interconnected with the linkage assembly in a variety of ways. In the illustrated embodiment, the spring-engaging member has a gear portion 78 with gear teeth on its outer face. This gear portion 78 is interconnected with the outwardly extending arm 76 so that rotation of the gear portion 78 causes rotation of the arm 76 about the central support 58. For purposes of illustration, only some of the gear teeth are shown in some of the views, with it being understood that the gear teeth extend over a sufficient arcuate distance to allow operation of the spring system.

In the illustrated embodiment, in order to interconnect the convertible top linkage assembly with the spring assembly, a gear element 90 is provided. The gear element 90 forms part of or is interconnected with a link or roof element that forms part of the convertible top linkage assembly. In the illustrated embodiment, the rearmost side rail 20 is interconnected with the gear element 90 such that rotation of the rearmost side rail 20 about body pivot 92 causes rotation of the gear element 90 also around the pivot 92. In the illustrated embodiment, the gear element 90 engages the teeth of the gear portion 78 of the spring-engaging member 56 such that rotation of the gear element 90 causes rotation of the spring-engaging member 56.

Referring to FIGS. 1 and 2, the convertible top linkage assembly is shown in the extended position. Retraction of the linkage assembly from the extended position to the retracted position will cause the side rail 20 to rotate in a clockwise direction, with respect to FIGS. 1 and 2, about body pivot 92. Gear element 90 therefore also rotates in a clockwise direction, and causes counterclockwise rotation of the spring-engaging member 56. This causes first spring element 52 to move in a direction that increases the load in the spring element 52. That is, the outer end of the arm 76 moves such that the protrusion 82 applies force to the outer end 72 of the spring element 52 thereby "winding" the spring element 52. At the same time, this movement causes the spring element 54 to move in a direction that decreases the load on the spring 54. That is, the outer end of the arm 76 moves such that the protrusion 84 moves in a direction so as to "unwind" the spring element 54. The protrusion may move out of contact with the outer end 74 of spring element 84.

For definitional purposes, the first spring element may be said to be in a loaded position when the top linkage is in a retracted position and may be said to be in a released position when the linkage assembly is in the mid position. Likewise, the second spring element 54 may be said to be in a loaded position when the linkage assembly is in an extended position and may be said to be in a released position when the linkage assembly is in the mid position. Also for definitional purposes, it should be clear to those of skill in the art that the "released" position of each of the springs may be a position in which the spring elements are still partially wound and therefore the spring elements are applying some force to the spring-engaging member. Alternatively, the spring elements may be completely released in the "released" position.

The spring system cooperates with the top linkage assembly so as to bias the linkage assembly from the extended position towards the mid position and also to bias the linkage assembly from the retracted position to the mid position. This assists in initial movement of the top linkage from the extended position towards the mid position and also in initial movement from the retracted position towards the mid position. This may be said to counterbalance some of the forces present in the overall top system allowing for easier operation. This spring system may be used with either a manual or power top.

As will be clear to those of skill in the art, the force necessary to assist movement of the top from the extended position towards the mid position and from the retracted position to the mid position may not be equal. The spring system may be designed such that the two spring elements are of different sizes so as to apply different amounts of force, or the relative forces may be adjusted in other ways.

Referring to FIG. 3, it will be clear to those of skill in the art that by adjusting the position of the outer end of the arm 68 relative to the body bracket 40, the position of the inner ends of the spring elements may be adjusted so as to adjust their relative released positions and to adjust the overall system.

As will be clear to those of skill in the art, the herein disclosed top linkage assembly and spring system may be altered in various ways without departing from the scope or teaching of the present invention. For example, other types of torsion springs may be substituted for the clock springs illustrated. Also, linear springs may be substituted. The interconnection of the spring system with the top linkage assembly may also be accomplished in ways other than illustrated. For example, the spring assembly may be directly interconnected with one of the links in the top system rather than being interconnected therewith through a geared interface. As an alternative, the spring system may be interconnected with the linkage system through an intermediate link that transmits force from the spring system to the linkage assembly. Further variations will be clear to those of skill in the art. It is the following claims, including all equivalents, which define the scope of the present invention.

The invention claimed is:

1. A convertible top for a vehicle having a vehicle body with a passenger compartment defined therein;
   a convertible top linkage assembly including a plurality of roof elements, the linkage assembly being movable between an extended position wherein the roof elements extend over the passenger compartment and a retracted position wherein roof elements are stowed at least partially in the vehicle body, the linkage assembly having a mid position defined such that the linkage assembly passes through the mid position when the linkage assembly is moved between the extended and retracted positions; and
   a spring system for assisting movement of the linkage assembly from the extended position to the mid position and from the retracted position to the mid position, the spring system including;
   a first spring element having a loaded position and a released position, the first spring element being biased from the loaded position to the released position, the first spring element being interconnected with the top linkage assembly such that the first spring element is in the loaded position when the linkage assembly is in the retracted position and is in the released position when the linkage assembly is in the mid position, the first spring element urging the linkage assembly from the retracted position to the mid position; and
   a second spring element having a loaded position and a released position, the second spring element being biased from the loaded position to the released position, the second spring element being interconnected with the top linkage assembly such that the second spring element is in the loaded position when the linkage assembly is in the extended position and is in the released position when the linkage assembly is in the mid position, the second spring element urging the linkage assembly from the extended position to the mid position.

2. The convertible top of claim 1, wherein:
   the roof elements comprise roof rails and roof bows;
   the top further including a flexible cover supported by the roof elements and defining an outer surface of the top when the roof elements are in the extended position.

3. The convertible top of claim 1, wherein:
   one of the roof elements is pivotally interconnected with the vehicle body; and
   the spring system being interconnected with the one of the roof elements.

4. The convertible top of claim 3, wherein:
   the one of the roof elements includes a gear element interconnected therewith; and
   the spring system including a spring engaging element, the spring engaging element having a gear portion engaged with the gear element such that rotation of the gear portion causes rotation of the gear element.

5. The convertible top of claim 3, wherein:
   the spring elements are clock springs each having an inner end and an outer end; and
   the spring system further comprising an adjustment member, one of the ends of each of the clock springs being interconnected with the adjustment member and the other of the ends of each of the clock springs being interconnected with the spring engaging element.

6. The convertible top of claim 1, wherein:

the spring system further comprising a spring engaging member; and the spring elements being clock springs each having an inner end and an outer end, one of the ends of each of the clock springs being interconnected with the spring engaging member.

7. The convertible top of claim 6, wherein:

the spring system further comprises an adjustment member; and the other of the ends of each of the clock springs being interconnected with the adjustment member.

8. The convertible top of claim 7, wherein:

the adjustment member has a central hub, the inner ends of the clock springs being interconnected with the central hub; and the spring engaging member having an outwardly extending arm, the outer ends of the clock springs engaging the outwardly extending arm.

* * * * *